United States Patent [19]

O'Neill et al.

[11] Patent Number: 4,961,321

[45] Date of Patent: Oct. 9, 1990

[54] BIS (DIFLUOROMETHYL) ETHER REFRIGERANT

[75] Inventors: Gerald J. O'Neill; Robert S. Holdsworth, both of Arlington, Mass.

[73] Assignee: W. R. Grace & Co.-Conn., New York, N.Y.

[21] Appl. No.: 316,627

[22] Filed: Feb. 28, 1989

[51] Int. Cl.$^5$ .................................................. C09K 5/02
[52] U.S. Cl. .......................................... 62/114; 252/67
[58] Field of Search ............................. 252/67; 62/114

[56] References Cited

U.S. PATENT DOCUMENTS

| | | | |
|---|---|---|---|
| 2,066,905 | 1/1937 | Booth | 260/151 |
| 2,500,388 | 3/1950 | Simons | 260/614 |
| 3,189,621 | 6/1965 | Harnik | 252/67 |
| 3,362,180 | 1/1968 | Eiseman, Jr. | 62/113 |
| 3,394,878 | 7/1968 | Eiseman, Jr. | 252/67 |
| 3,409,555 | 11/1968 | Eiseman, Jr. | 252/67 |
| 3,505,410 | 4/1970 | Scherer et al. | 260/614 |
| 3,723,318 | 3/1973 | Butler | 252/67 |
| 3,887,439 | 6/1975 | Hutchinson | 203/63 |
| 3,922,228 | 11/1975 | Hutchinson | 252/67 |
| 4,041,148 | 8/1977 | Simons et al. | 424/45 |
| 4,139,607 | 2/1979 | Simons et al. | 424/45 |
| 4,559,154 | 12/1985 | Powell | 252/69 |

*Primary Examiner*—Paul Lieberman
*Assistant Examiner*—Christine A. Skane
*Attorney, Agent, or Firm*—John Dana Hubbard; William L. Baker

[57] ABSTRACT

A chlorine-free refrigerant comprised of bis (difluoromethyl)ether; $CHF_2OCHF_2$. The refrigerant may be used alone or in combination with other refrigerants. The bis (difluoromethyl) ether refrigerant is environmentally safe, non toxic, non flammable and has the desired physical, chemical and thermodynamic properties necessary for a refrigerant.

10 Claims, No Drawings

BIS (DIFLUOROMETHYL) ETHER REFRIGERANT

The present invention relates to a refrigerant based upon bis (difluoromethyl) ether, $CHF_2OCHF_2$. The present invention is chlorine-free and is an alternative to chlorofluorocarbon based refrigerants.

BACKGROUND OF THE INVENTION

Refrigeration systems are designed to produce a cooling effect. These systems are typically used for the cool storage of food and for air conditioning.

The basic principle of refrigeration is cause a substance to undergo a physical change from liquid to vapor in order to obtain the cooling effect.

The substance is commonly referred to as the refrigerant. The refrigerant is generally contained in a closed, pressurized system having two major portions, the condenser and the evaporator. During a refrigeration cycle, the refrigerant in liquid form is supplied from the condenser to the evaporator where it is caused to change to its vapor phase. The heat to be removed is absorbed by the evaporator to evaporate the liquid refrigerant. The absorbed heat is then expelled in the condensor by condensing the refrigerant vapors into liquid form. The cycle is then continuously repeated.

The most commonly used refrigerants are known as chlorofluorocarbons (CFCs). These CFCs are generally fully halogenated, meaning that the hydrogen atoms of the hydrocarbon have been replaced with a halogen such as chlorine or fluorine.

CFCs are now believed to cause the destruction of the ozone layer of the Earth. The ozone layer is located in the upper layer of the atmosphere, known as the stratosphere. Ozone ($O_3$) is formed by an interaction of molecular oxygen with the ultraviolet radiation (UV) of the sun. The presence of chlorine in the stratosphere is believed to cause the breakdown of ozone. The chlorine contained in the CFCs is believed to be the major source of chlorine in the stratosphere. It is believed that unless the amount of chlorine in the stratosphere is reduced, the stratosphere will not be capable of generating sufficient ozone and the harmful UV radiation of the sun will be let through to the surface of the Earth. A recent international agreement will limit the production of most of these CFCs in order to reduce the depletion of the ozone layer.

This agreement has caused intense concern in the refrigeration and air conditioning industry about the availability and effectiveness of substitute refrigerants. While it is believed that the development of substitute refrigerants that do not destroy the ozone will occur, there is some hesitation that the qualities or properties of the current CFC type refrigerants might be compromised.

To be useful as a refrigerant, any new refrigerant must have the following characteristics:

Chemical Stability—the refrigerant should not decompose or react with other components or contaminants in the refrigeration system, preferably, the refrigerant is completely stable in the system, yet should be capable of decomposing in the atmosphere (by UV radiation or chemical reaction) before it reaches the ozone layer.

Safety—the selected refrigerant should have a low order of toxicity properties and should be non flammable.

Thermodynamic Properties—the selected refrigerant should have suitable critical or boiling point temperatures and heat capacity in its vapor stage in order to be useful as a refrigerant. Generally, a suitable refrigerant should have a freezing point of less than $-40°$ F. ($-40°$ C.), a critical temperature greater than $122°$ F. ($50°$ C.), a vapor pressure at $176°$ F. less than 735 psia (5 MPa) and a latent heat times vapor density greater than 27.8 $Btu/ft^3$ (1.0 kJ/l).

Other desirable parameters for the substitute refrigerants include high oil solubility, the ability to blend with other refrigerants, high vapor dielectric strength, compatibility with the materials of the refrigeration system, especially copper, easy leak detection and low cost.

Current attempts to provide new refrigerants have focused upon other CFCs which are not fully halogenated and therefore are likely to break down in the lower atmosphere. Various blends of such CFCs have been proposed. Additionally, in article entitled "Quest For Alternatives", by McLinden and Didion in ASHRAE Journal, Dec., 1987, the authors also suggest that the search for CFC alternatives focus on these non fully halogenated CFCs rather than non-chlorofluorocarbon compounds.

SUMMARY OF THE INVENTION

The present invention is a non-chlorofluorocarbon refrigerant based upon bis (difluoromethyl) ether. The refrigerant containing the bis (difluoromethyl) ether is chemically stable, environmentally safe, is low in toxicity and flammability and provides good thermodynamic properties. This compound does not contain any chlorine and therefore will not contribute to the destruction of atmospheric ozone.

DETAILED DESCRIPTION

The compound used in the present invention is a symmetrical dimethyl ether constituted by methyl groups on which two of the hydrogen atoms have been replaced by fluorine atoms. The compound has the following formula: ($CHF_2OCHF_2$).

This compound has been found to possess the correct combination of physical, chemical and environmental properties which allows for its use in refrigeration systems as a refrigerant. The compound is stable, chlorine-free, non flammable, and resistant to alkaline hydrolysis.

Being chlorine-free, it is believed in view of the current scientific knowledge, that the bis (difluoromethyl) ether will not have a deleterious effect upon the ozone layer. Further, it is believed that the compound, while stable in a refrigeration system, will break down in the lower atmosphere and not reach the ozone layer. In part, it is believed that the presence of the hydrogen atoms in the molecule will cause the eventual breakdown of the compound in the atmosphere.

The compound has been found to have no deleterious physiological effects when a living creature is exposed to the compound. The compound is not toxic and was found not to cause convulsions. In terms of anesthetic effects, only mild activity was shown after having exposed mice to the compound for a two hour period. Additional studies have shown that the compound is not toxic at concentrations of up to 20% by volume for mice exposed for a period of two hours. The safety of the compound has been further demonstrated by exposing rats to a 5% by volume concentration of the compound for 3 hours a day for 5 days, with no sign of convulsions nor deaths being recorded. The compound has also been found to be non mutagenic with negative results on the Ames test.

The compound has been found to be non flammable even when in contact with a direct flame.

The compound's physical properties fall within the parameters required for refrigerants today. Table I lists a variety of the physical properties of bis (difluoromethyl) ether.

TABLE I

Physical Properties of bis (difluoromethyl) ether

| | |
|---|---|
| Molecular weight | 118 |
| Critical Temperature (°F.) | 285.8 |
| Boiling Point (°F.) | 39.2 |
| Freezing Point (°F.) | −240 |
| Vapor Pressure (psia at 158° F.) | 110.0 |
| Vapor Density at Boiling Point (gm/l) | 5.304 |
| Liquid Density at 78° F. (gm/cc) | 1.364 |

The physical and thermodynamic properties of the bis (difluoromethyl) ether are similar to those of well known CFC refrigerants, in particular R114, R113 and R21.

The preparation of bis (difluoromethyl) ether is well known. The process generally involves the fluorination of a dimethyl ether. The ether may be prepared by an electrochemical fluorination process. This process requires the passage of an electric current through a liquid hydrogen fluoride electrolyte contained in an electrolysis cell having a cathode and an anode. A feedstock of dimethyl ether is provided to the electrolysis cell and into contact with the anode under fluorinating conditions. The reaction product of the electrolysis cell is a mixture of various fluorinated methyl ethers, including bis (difluoromethyl) ether.

Another useful process in forming bis (difluoromethyl) ether is to first chlorinate a dimethyl ether stream, separate out the chlorinated dimethyl ether substiuent and then fluorinate the substituent with antimony fluoride to obtain bis (difluoromethyl) ether.

The reaction is as follows:

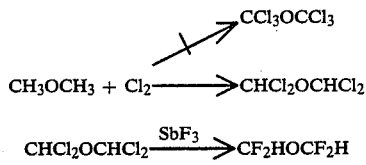

A third method is to use difluorochloromethane as a starting material. The difluorochloromethane is converted to an ether. The ether is then chlorinated and fluorinated as above.

The synthesis has the following steps:

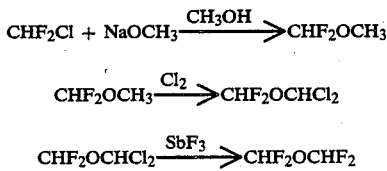

While the bis (difluoromethyl) ether compound is useful as a refrigerant by itself, it may also be blended with other refrigerants, if desired, so that one may obtain a desired balance of properties.

For example, the refrigerant of this invention may be blended with other fluoro ethers such as a trifluoromethyl ether, traditional chlorofluorocarbon refrigerants, hydrofluoroalkanes, such as hydrofluoromethanes, ethanes and propanes, and various other materials such as carbon dioxide and nitrous oxide.

Additionally, the refrigerant of the present invention may be added to another refrigerant to form an azeotropic composition useful as a refrigerant. Azeotropic compositions are defined as constant boiling admixtures of two or more substances which tend to behave as though only one substance was involved.

No meaningful limitations can be set as to the proportions of refrigerants to be used, as the choice of a refrigerant for a specific application is determined by the physical, chemical and thermodynamic properties needed for that application.

However, generally one can employ the refrigerant of the present invention in an amount from about 1% to about 100% by total weight of refrigerant used in the refrigeration system. Preferably, the bis (difluoromethyl) ether refrigerant will comprise at least 50% of the total weight of refrigerant used and more preferably, it will comprise from about 75% to 99% by weight of the refrigerant used.

While the present invention has been described with reference to its preferred embodiments, variations and modifications of these embodiments would be obvious to one skilled in the art and it is intended to cover in the appended claims the variations and modifications of the invention as fall within the true spirit and scope of the invention.

What is claimed:

1. A process for producing refrigeration comprising:
   (a) condensing a refrigerant compound formed of bis (difluoromethyl) ether, and
   (b) thereafter evaporating the refrigerant in the vicinity of a body to be cooled.

2. The process of claim 1 further comprising the addition of one or more non-chlorofluorocarbon refrigerants to the refrigerant compound in an amount such that the bis (difluoromethyl) ether is present in an amount of from about 1 to about 100% by weight of the total refrigerant.

3. A refrigeration system comprising a condensor, an evaporator a refrigerant and means for moving the refrigerant between the condensor and evaporator, wherein the refrigerant comprises a bis (difluoromethyl) ether.

4. The refrigeration system of claim 3 further comprising one or more additional refrigerants selected from the group consisting of chlorofluorocarbons, fluorocarbons, non-chlorofluorocarbons, carbon dioxide and nitrous oxide, the one or more additional refrigerants being present in an amount such that the bis(difluoromethyl) ether refrigerant comprises from about 1 to about 100% by weight of the total refrigerant.

5. A process for producing refrigeration comprising condensing a refrigerant compound formed of from about 1 to 100% by weight of bis(difluoromethyl) ether and thereafter evaporating the refrigerant in the vicinity of a body to be cooled.

6. The process of claim 5 wherein the refrigerant is a blend of bis(difluoromethyl) ether and one or more additional refrigerants selected from the group consisting of non-chlorofluorocarbon, chlorofluoro carbons, fluorocarbons, carbon dioxide and nitrous oxide.

7. The process of claim 5 wherein the amount of bis(difluoromethyl) ether is at least 50% of the total weight of refrigerant used.

8. A refrigeration system comprising a means for condensing refrigerant, a means for evaporating refrigerant, a means for moving refrigerant between the condensing means and evaporation means and a refrigerant consisting of bis(difluoromethyl) ether.

9. A refrigeration system comprising a means for condensing a refrigerant, a means for evaporating a refrigerant a means for moving a refrigerant between the condensing means and evaporation means and a refrigerant comprised of from about 1 to about 100% by weight of refrigerant of bis(difluoromethyl) ether and the remainder of the refrigerant being selected from the group consisting of chlorofluorocarbons, non-chlorofluorocarbons, fluorocarbons, carbon dioxide and nitrous oxide.

10. The refrigeration system of claim 9 wherein the refrigerant is an azeotrope containing at least a 50% by total weight of bis(difluoromethyl) ether.

* * * * *